US008930807B2

(12) United States Patent
Haubrich et al.

(10) Patent No.: US 8,930,807 B2
(45) Date of Patent: *Jan. 6, 2015

(54) WEB CONTENT MANAGEMENT BASED ON TIMELINESS METADATA

(75) Inventors: Manfred Haubrich, Gensingen (DE); Simon Lorenz, Geisenheim (DE); Frank Marschollek, Idar-Oberstein (DE); Rainer Wolafka, Hofheim-Langenhain (DE); Alexander Wolf-Reber, Dietzenbach (DE)

(73) Assignee: International Business Machines Corporation, Armonk, NY (US)

( * ) Notice: Subject to any disclaimer, the term of this patent is extended or adjusted under 35 U.S.C. 154(b) by 267 days.

This patent is subject to a terminal disclaimer.

(21) Appl. No.: 13/452,387

(22) Filed: Apr. 20, 2012

(65) Prior Publication Data

US 2013/0047073 A1 Feb. 21, 2013

Related U.S. Application Data

(63) Continuation of application No. 13/211,654, filed on Aug. 17, 2011, now Pat. No. 8,365,069.

(51) Int. Cl.
*G06F 17/22* (2006.01)
*G06F 15/16* (2006.01)
*G06F 17/30* (2006.01)

(52) U.S. Cl.
CPC .................................. *G06F 17/3089* (2013.01)
USPC ........... 715/234; 715/201; 715/205; 715/760; 709/203; 709/219

(58) Field of Classification Search
USPC ......... 715/200, 201, 202, 204, 205, 226, 234, 715/760, 841; 709/201, 203, 217, 218, 219
See application file for complete search history.

(56) References Cited

U.S. PATENT DOCUMENTS 6,886,005 B2 4/2005 Davis
7,325,193 B2 1/2008 Edd et al.

(Continued)

FOREIGN PATENT DOCUMENTS

WO 0157729 A1 8/2001
WO WO2007076459 * 7/2007

OTHER PUBLICATIONS

Ektron, Inc.; Ektron CMS400.NET User Manual; Version 7.0, Revision 4; May 2007; Nashua, NH.

(Continued)

*Primary Examiner* — Maikhanh Nguyen
(74) *Attorney, Agent, or Firm* — Parashos T. Kalaitzis; Robert C. Rolnik

(57) ABSTRACT

A server receives a hypertext request from a client. The server looks up a hypertext document, wherein looking up comprises obtaining a first HTML element and a second HTML element and combining the first HTML element and second HTML element into a hypertext document, in response receiving the hypertext request from the client. The server parses the hypertext document for timeliness tags. The server generates at least one header tag based on the timeliness tags. The server determines whether at least one expired tag is among the timeliness tags. Responsive to a determination that at least one expired tag is among the timeliness tags, the server can look up a timeliness tag rule corresponding to the at least one timeliness tag.

11 Claims, 5 Drawing Sheets

(56) References Cited

U.S. PATENT DOCUMENTS

| | | | |
|---|---|---|---|
| 8,364,720 B2* | 1/2013 | Levy | 707/803 |
| 8,543,608 B2* | 9/2013 | Koul et al. | 707/791 |
| 2002/0116525 A1* | 8/2002 | Peters et al. | 709/242 |
| 2002/0199013 A1* | 12/2002 | Sorensen | 709/236 |
| 2003/0149737 A1* | 8/2003 | Lambert et al. | 709/214 |
| 2003/0182332 A1* | 9/2003 | McBrearty et al. | 707/206 |
| 2004/0025115 A1* | 2/2004 | Sienel et al. | 715/513 |
| 2004/0205480 A1* | 10/2004 | Moore | 715/500.1 |
| 2006/0149807 A1* | 7/2006 | Ding et al. | 709/203 |
| 2007/0192352 A1* | 8/2007 | Levy | 707/102 |
| 2007/0277102 A1 | 11/2007 | Kanzaki | |
| 2008/0034003 A1* | 2/2008 | Stakutis et al. | 707/200 |
| 2009/0012992 A1* | 1/2009 | Gill et al. | 707/103 R |
| 2009/0077173 A1 | 3/2009 | Lowery et al. | |
| 2011/0060778 A1* | 3/2011 | Dallari et al. | 707/829 |
| 2012/0072845 A1* | 3/2012 | John et al. | 715/738 |

OTHER PUBLICATIONS

Adobe Systems Inc.; Using Adobe Contribute CS5; Oct. 22, 2010; San Jose, CA.

* cited by examiner

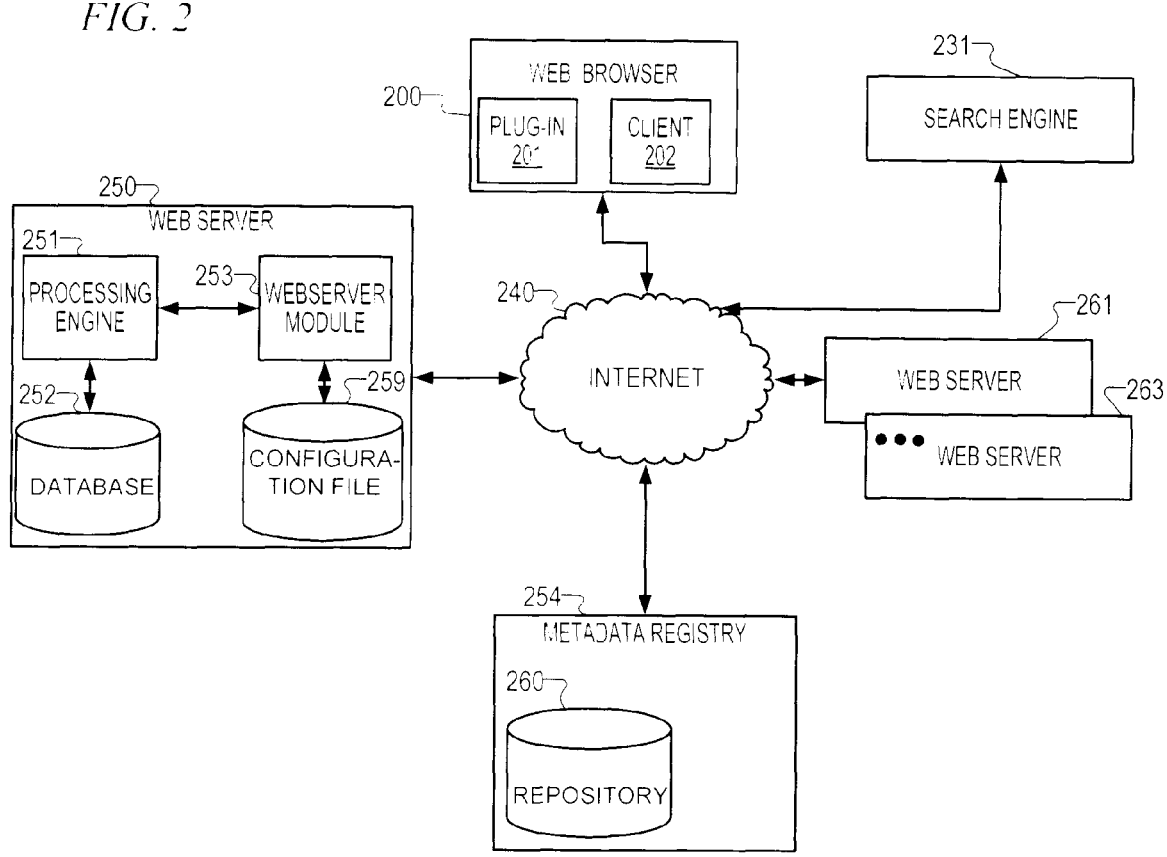

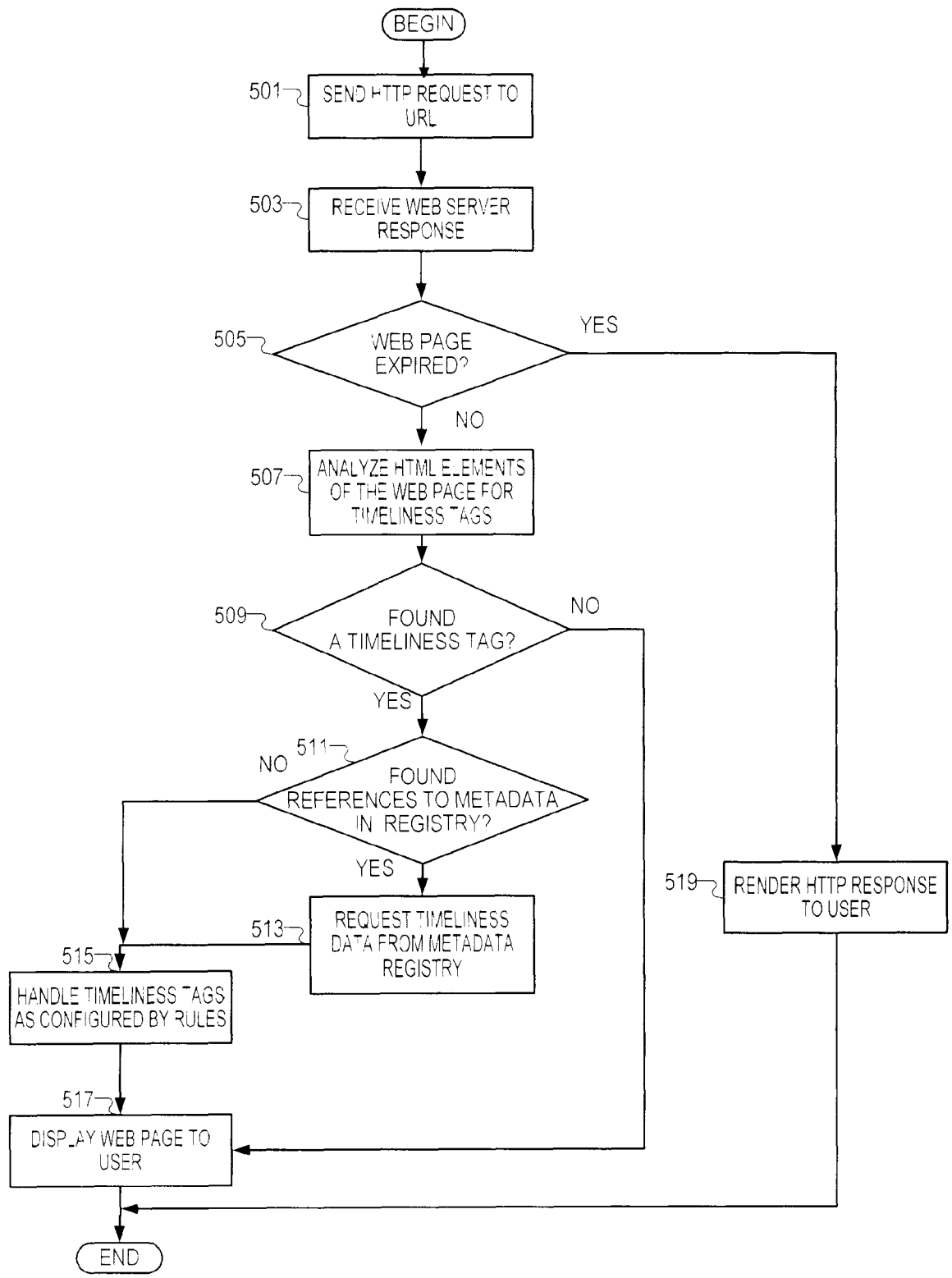

603 — `<img src="path/pic.bmp" create-date="http://www.meta-registry.com?uid=1234&create">`
605 — `<img src="path/pic.bmp" expire-date="http://www.meta-registry.com?uid=1234&create">`
607 — `<img src="path/pic.bmp" create-date="http://www.meta-registry.com?uid=1234&create" expire-date="http://www.meta-registry.com?uid=1234&expire">`
609 — `<img src="path/pic.bmp" create-date="http://www.meta-registry.com?uid=1234&create" expire-date="2012-12-31">`

621

623 — `<HTML>`
625 — `<HEAD>`
627 — `<META NAME="EARLIEST-CREATE-DATE" CONTENT="2011-01-03">`
629 — `<META NAME="LATEST-EXPIRE-DATE" CONTENT="2014-01-03">`
631 — `</HEAD>`

WEB CONTENT MANAGEMENT BASED ON TIMELINESS METADATA

This application is related to commonly assigned and co-pending U.S. patent application Ser. No. 13/211,654 entitled "WEB CONTENT MANAGEMENT BASED ON TIMELINESS METADATA," filed on Aug. 17, 2011, and hereby incorporated by reference.

BACKGROUND

The present invention relates generally to a computer implemented method for sorting information, and more specifically, to searching hypertext documents and selectively transmitting and/or displaying a document and/or its component parts.

Metadata is data about data, or more specifically, data concerning the content of data. Metadata can include the source of data, the type of data, and dates related to data. For example, a granted patent has at least two associated metadata. First, the granted patent has a filing date that identifies when the data was submitted as a patent application to the U.S. Patent and Trademark Office. Second, the granted patent has a granted date, which is the date on which the patent office granted the patent in a way that permits the owner to enforce his rights to the material described therein.

Metadata plays a key role in the Internet. Specifically, as used in markup languages such as hypertext markup language (HTML), metadata can be placed in documents in a manner that is not ordinarily visible to a user of a modern browser. This metadata is enclosed in one or more HTML tags. The first HTML pages were authored by people in a way where each keystroke is typically added by a human being. However, as new models for blending articles with advertising and navigation evolved, pages began to appear based on fragments or elements that were authored independent of one from the other.

Search engines are a combination of databases that are fed by information collected by spiders. Spiders are automated programs that collect HTML by methodically traversing the links in each page. Spiders can obtain metadata based on the date that the spider visited an HTML page, for example, as defined by its universal resource locator (URL). Such information can be used later to filter results of a search engine query to a specified range of dates—where the dates are those dates that the spider collected the data.

One limitation of the above method of creating 'date' metadata is that the search engine only identifies the date on which the spider visited the web page. Nothing indicates the creation date. Conventional web pages' HTML tags also do not identify an expiration date, nor other metadata concerning when the web page, or its component elements, is obsolete or otherwise invalid. In addition, the component parts themselves may have distinct creation dates, which the prior art fails to identify in HTML tags.

Accordingly, a remedy is sought.

SUMMARY

According to one embodiment of the present invention, a computer implemented method for responding to hypertext requests is disclosed. A server receives a hypertext request from a client. The server looks up a hypertext document, wherein looking up comprises obtaining a first HTML element and a second HTML element and combining the first HTML element and second HTML element into a hypertext document, in response to receiving the hypertext request from the client. The server parses the hypertext document for timeliness tags. The server generates at least one header tag based on the timeliness tags. The server determines whether at least one expired tag is among the timeliness tags. Responsive to a determination that at least one expired tag is among the timeliness tags, the server can look up a timeliness tag rule corresponding to the at least one timeliness tag.

BRIEF DESCRIPTION OF THE SEVERAL VIEWS OF THE DRAWINGS

FIG. 2 is a block diagram of a network architecture in accordance with an illustrative embodiment of the invention;

FIG. 3A is starting strings for timeliness tags in accordance with an illustrative embodiment of the invention;

FIG. 3B is a table or data structure of the related information applicable to a HyperText Markup Language element (HTML element) in accordance with an illustrative embodiment of the invention;

FIG. 5 is a flowchart of methods and/or processes performed at a client machine in accordance with an illustrative embodiment of the invention; and FIG. 6 is an example of registry references in accordance with an illustrative embodiment of the invention.

DETAILED DESCRIPTION

Figure 1:
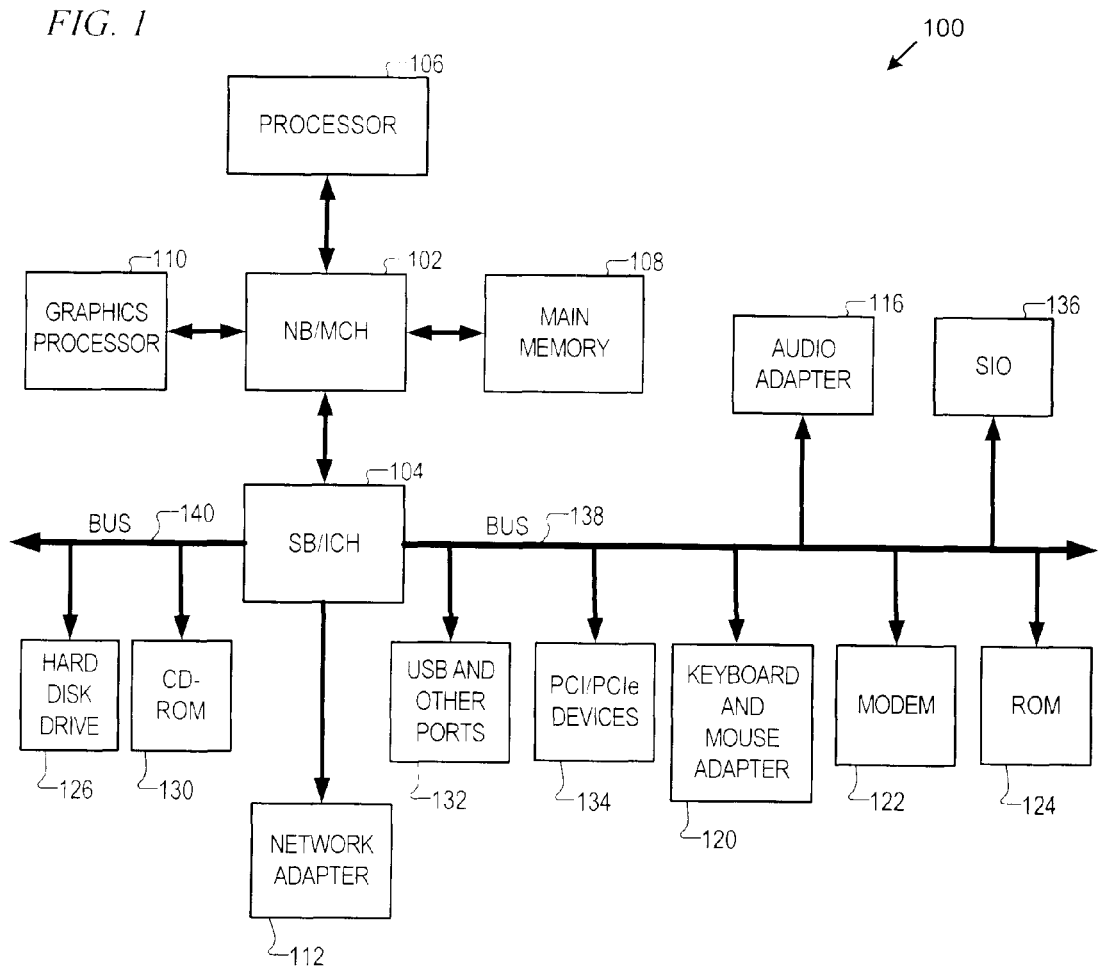
FIG. 1 is a block diagram of a data processing system in accordance with an illustrative embodiment of the invention.

With reference now to the figures and in particular with reference to FIG. 1, a block diagram of a data processing system is shown in which aspects of an illustrative embodiment may be implemented. Data processing system 100 is an example of a computer, in which code or instructions implementing the processes of the present invention may be located. In the depicted example, data processing system 100 employs a hub architecture including a north bridge and memory controller hub (NB/MCH) 102 and a south bridge and input/output (I/O) controller hub (SB/ICH) 104. Processor 106, main memory 108, and graphics processor 110 connect to north bridge and memory controller hub 102. Graphics processor 110 may connect to the NB/MCH through an accelerated graphics port (AGP), for example.

In the depicted example, local area network (LAN) adapter 112 connects to south bridge and I/O controller hub 104 and audio adapter 116, keyboard and mouse adapter 120, modem 122, read only memory (ROM) 124, hard disk drive (HDD) 126, CD-ROM drive 130, universal serial bus (USB) ports and other communications ports 132, and PCI/PCIe devices 134 connect to south bridge and I/O controller hub 104 through bus 138 and bus 140. PCI/PCIe devices may include, for example, Ethernet adapters, add-in cards, and PC cards for notebook computers. PCI uses a card bus controller, while PCIe does not. ROM 124 may be, for example, a flash binary input/output system (BIOS). Hard disk drive 126 and CD-ROM drive 130 may use, for example, an integrated drive electronics (IDE) or serial advanced technology attachment (SATA) interface. A super I/O (SIO) device 136 may be connected to south bridge and I/O controller hub 104.

An operating system runs on processor 106 and coordinates and provides control of various components within data processing system 100 in FIG. 1. The operating system may be a commercially available operating system such as Microsoft® Windows® XP. Microsoft and Windows are trademarks of Microsoft Corporation in the United States, other countries, or both. An object oriented programming system, such as the Java™ programming system, may run in conjunction with the operating system and provides calls to the operating system from Java™ programs or applications executing on data processing system 100. Java™ is a trademark of Sun Microsystems, Inc. in the United States, other countries, or both.

Instructions for the operating system, the object-oriented programming system, and applications or programs are located on computer readable tangible storage devices, such as hard disk drive 126, and may be loaded into main memory 108 for execution by processor 106. The processes of the present invention can be performed by processor 106 using computer implemented instructions, which may be located in a memory such as, for example, main memory 108, read only memory 124, or in one or more peripheral devices.

Those of ordinary skill in the art will appreciate that the hardware in FIG. 1 may vary depending on the implementation. Other internal hardware or peripheral devices, such as flash memory, equivalent non-volatile memory, and the like, may be used in addition to or in place of the hardware depicted in FIG. 1. In addition, the processes of the illustrative embodiments may be applied to a multiprocessor data processing system.

In some illustrative examples, data processing system 100 may be a personal digital assistant (PDA), which is configured with flash memory to provide non-volatile memory for storing operating system files and/or user-generated data. A bus system may be comprised of one or more buses, such as a system bus, an I/O bus, and a PCI bus. Of course, the bus system may be implemented using any type of communications fabric or architecture that provides for a transfer of data between different components or devices attached to the fabric or architecture. A communication unit may include one or more devices used to transmit and receive data, such as a modem or a network adapter. A memory may be, for example, main memory 108 or a cache such as found in north bridge and memory controller hub 102. A processing unit may include one or more processors or CPUs. The depicted example in FIG. 1 is not meant to imply architectural limitations. For example, data processing system 100 also may be a tablet computer, laptop computer, or telephone device in addition to taking the form of a PDA.

The terminology used herein is for the purpose of describing particular embodiments only and is not intended to be limiting of the invention. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

As will be appreciated by one skilled in the art, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system."

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Embodiments are described below with reference to flowchart illustrations and/or block diagrams apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The illustrative embodiments permit a web server to identify timeliness data concerning HTML elements so that spiders and clients can apply criteria when searching, highlighting, rendering or otherwise preparing a referenced web page for user review. For example, a client, having available expiration data, may substitute a placeholder for an HTML element in response to that HTML element being expired. In addition, a search engine, based on earlier-retrieved spider results, can filter web pages on the basis of creation time or expiration time, as may be present in the new timeliness tags. As a result, content may be inhibited from being displayed and/or referenced when such data is premature or expired.

FIG. 2 is a block diagram of a network architecture in accordance with an illustrative embodiment of the invention. FIG. 2 features a web browser. A web browser is a device that hosts a client, and optionally a plug-in. Web browser 200 may be implemented as data processing system 100 of FIG. 1. A client is a data processing system that supports the hypertext transfer protocol (HTTP). A client can be, for example, a basic text-only browser executing in a computer, such as Lynx. A client can be, for example, a spider executing on a computer, for example, spiders operated by search engine companies. Alternatively, a client can be a modern browser suitable for handling a variety of content, such as Firefox® or Chrome™. Firefox is a registered trademark of the Mozilla Foundation. Google Chrome™ browser is a trademark of Google, Inc. Web browser 200 relies on client 202 to coordinate communications with machines reached on the internet and render such results to, for example, a display. Client 202 may use plug-in 201 to render advanced file types, such as streaming audio or streaming video, among others. Additional plug-ins may be present to assist web browser 200. Accordingly, a plug-in can enhance a browser's ability to render and/or synthesize a web page for human consumption.

Web browser 200 may make requests to machines for web pages, using, for example, Internet 240. Machines include, for example, web servers 250, 261, 263, search engine 231 and metadata registry 254.

A web server is a data processing system that executes a host process that responds to hypertext requests either with resolved content transmitted to the requester or with a status indication. A web server may be implemented as data processing system 100 of FIG. 1. The web server may host a processing engine as a process that responds to hypertext transport protocol (HTTP) requests. Accordingly, processing engine 251 may be a daemon executing using the resources of web server 250. The processing engine may respond to HTTP requests with content having associated HTML tags of at least a head and body type. This content, in combination with the HTML tags, is known as a hypertext document. A hypertext document is a file that substantially adheres to the conventions described by the World Wide Web Consortium (W3C), for example. For example, a hypertext document, also referred to as HTML document, is content that is enclosed at least by the <html></html> tags, <body></body> tags, and has an associated <head></head> tag. Many additional HTML tags are also allowed in a hypertext document. In addition, tags that are well-formed XML (eXtended Markup Language) tags that do not conform to W3 C can also be present in a hypertext document. Periodically, processing engine 251 may coordinate with database 252, web server module 253 and configuration file 259. Database 252 may be a data structure of locally stored files that supply content to the processing engine.

In some cases, a requested web page may include contents entirely located in database 252. However, in other cases, further web servers may provide content within subcomponents of the web page described in the request. For example, web server 250 may request dynamic content from web server 261.

Processing engine 251, while processing HTML tags, may encounter timeliness tags described further below. Handling of such timeliness tags may be delegated to web server module 253. The operation of the web server, generally, and also of the web server module, can be according to the flowchart in FIG. 5, below.

Web server module 253 may be passed HTML elements that the processing engine parses from an initial web page located in database 252. A web server module is a software component which may be selected to execute and operate cooperatively with a processing engine of a web server. The web server module may operate to selectively dynamically generate an HTTP response that analyzes HTML elements for timeliness tags, and selects such elements for further processing and resolution. An HTML element is content that is bounded by at least an opening tag and a closing tag. These tags are HTML tags that define some feature of the enclosed content. Such features can include text decorations, references to external content, file types and the like. As such, an HTML tag can make references that the web server module can resolve by making further requests to metadata registry 254. Metadata registry 254 may consult repository 260, which is a data structure designed to resolve timeliness information that is associated with a unique identifier that is located in the applicable HTML tag. FIG. 3B, below, explains further this data structure.

FIG. 3A is starting strings for the timeliness tags in accordance with an illustrative embodiment of the invention. A timeliness tag is an HTML tag that associates content to a date, either for purposes of determining if the current time is before or after the creation date (or create-date, as the string is stated in the tag) and/or for determining if the current time is before or after the expiration date (or expire-date). The purpose of the timeliness tag is described by the 'meta name' field. For example, in create-date timeliness tag 301 the tag name is "create-date" 311. An attribute is associated with the tag, in this case, "2011-01-03". Further examples of the use of create-date include:

a) Picture declaration:
     <img src="path/pic.bmp" create-date="2010-01-01" expire-date="2012-12-31" />
b) Paragraph declaration:
     <p expire-date="http://www.meta-registry.com?uid=5678&expire" >
     ...
     </p>
c) embedded object declaration ('create-date' can be interpreted as 'day of recording')
     <object data="aGreatSong.mp3" type="audio/mpeg" title="my song" create-date="2010-12-31">
       <a href="ourHomePage.html">web page of our band</a>
       </object>
and, d) a regular link ('create-date' can be interpreted as 'day of first publishing')
     <a href="MyFirstPublication.pdf" create-date="2005-04-03"> My first publication</a>

Note, that the use of ellipses (" . . . "), above, the ellipses represent further arbitrary content and/or HTML tags. Expire-date timeliness tag 303 is another form of a timeliness tag. In this HTML tag, the 'name' field is expire-date 313. Accordingly, this HTML tag assigns an expiration to the content enclosed between this HTML tag and its matching 'end tag'. In an example where HTML tag 301 encloses content, the tag becomes expired when the date is after 2012-12-31, or Dec. 31, 2012. Generally, this status is referred to as an invalid period. In contrast, a valid period is the time that is during and after the earliest create date but during or before the latest expire date—in this case, extending from Jan. 3, 2011 through Dec. 31, 2012.

HTML tag 321 is a timeliness tag used within the 'head' portion of a web page. HTML tag 321 is an "earliest-create-date" field. Embodiments may derive this tag on the basis of the metadata content of "create-date" timeliness tags found within the 'body' portion of the web page. In other words, a web server can parse the body of the web page for all create-date timeliness tags, and select the timeliness tag that has the earliest date. Once that earliest date is located, the server can generate content field 328 of the earliest-create-date.

Similarly, HTML tag 323 is a timeliness tag used within the 'head' portion of a web page. HTML tag 323 is a "latest-expire-date" field. Embodiments may derive this tag on the basis of the metadata content of "expire-date" timeliness tags found within the 'body' portion of the web page, for example, see expire-date timeliness tag 303. In other words, a web server can parse the body of the web page for all expire-date timeliness tags, and select the timeliness tag that has the latest date. Once that latest date is located, the server can generate content field 328 of the latest-expire-date.

FIG. 3B is a table or data structure of the related information applicable to a HyperText Markup Language element (HTML element) in accordance with an illustrative embodiment of the invention. Data structure 300 may describe the data fields that are used in repository 260 of FIG. 2. The data fields are stored and/or retrieved through the use of a unique identifier (UID) 350. UID 350 may be unique at least within the context of the repository. Additional fields of owner 351 and "last update" 355 can be used for administrative purposes by content providers or other owners.

In addition, when a timeliness tag merely references a UID but otherwise fails to specify an actual date, data structure 300 may be used to obtain both a creation date (create-date 352) and an expiration date (expire-date 353) through the use of a reference to locate data from a central repository. Such a data structure can simplify the management of dates applicable to specific HTML elements located among a set of scattered web servers. For example, a web page in web server 250 can reference a UID of "5678". In this example, metadata registry 254 can respond to requests by looking up in data structure 300 the create-date of 2011-12-20 and the expire-date of 2011-12-25.

Although the create-date timeliness tag and the expire-date timeliness tag are expressed in the several figures as dates corresponding to a Gregorian calendar, it is appreciated that these dates can be expressed in any coordinated time format and can be in gradations of a second or smaller. In addition, the date may be expressed with an offset from coordinated universal time.

Figure 4:
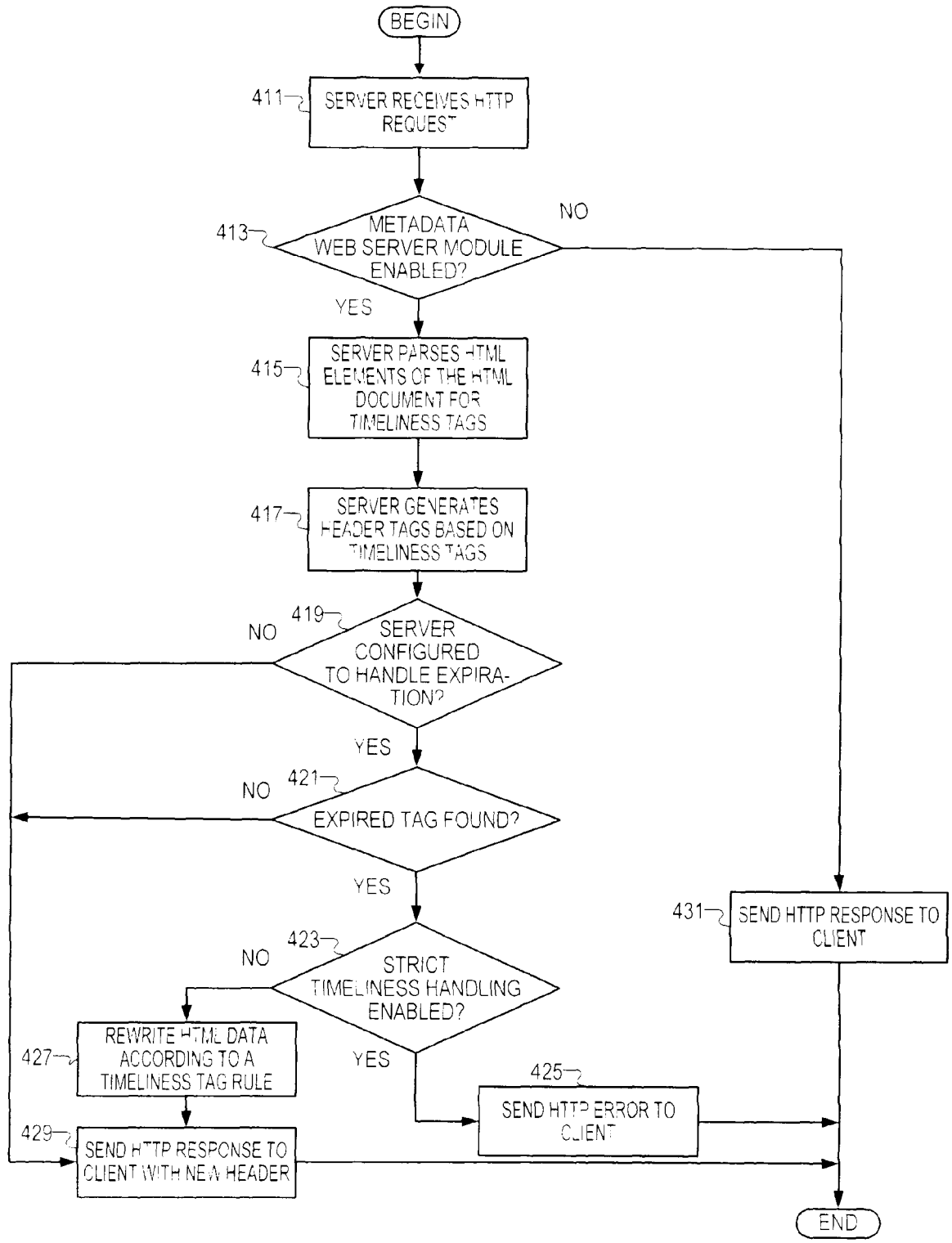
FIG. 4 is a flowchart of methods and/or processes performed at a server machine in accordance with an illustrative embodiment of the invention.

FIG. 4 is a flowchart of methods and/or processes performed at a server machine in accordance with an illustrative embodiment of the invention. Initially, a server, such as web server 250 of FIG. 2, may receive a HTTP request (step 411). A hypertext request, also referred equivalently as an HTTP request, is a request for a hypertext document that conforms to the W3C hypertext request format. Next, the server may determine if a metadata web server module is enabled (step 413). The server may perform this step by parsing a configuration file for an indicator that the web server module is enabled. The web server module may be the software component that establishes the scope, content, and handling of individual timeliness tags.

If the determination at step 413 is negative, the server may send an HTTP response to a client (step 431). Processing may terminate thereafter.

However, if the determination at step 413 is positive, the server may parse HTML elements of the HTML document for timeliness tags (step 415). Parsing HTML elements for timeliness tags may include requesting timeliness details from the metadata registry contained in the timeliness tag. Timeliness details can be either expire-date or create-date times associated with the HTML element of the timeliness tag. The request can be formulated and directed to a metadata registry provided the server locates an URL for the registry in the applicable timeliness tag. FIG. 6, below, describes the ability to reference the metadata registry with URLs.

Next, the server may generate header tags based on the timeliness tags (step 417). In other words, the server may modify the HTML document, in its header, to include an indication of an earliest create date that results from a checking the set of create date timeliness tags for the earliest of all such dates. Similarly, the server may modify the HTML document to include, in its header, an indication of the latest expiration date that results from checking the set of expire date timeliness tags for the latest of all such dates. In summary, step 417 involves the server generating at least one header tag based on the timeliness tags.

Next, the server may determine if the server is configured to handle expiration (step 419). If the server is not configured in this way, the server may continue by sending an HTTP response to the client with the new header (step 429). The setting of handling expiration can be done by setting a field in a configuration file. Accordingly, the determination step 419 can be done by the server checking the configuration file or other data structure for the status of the field. Processing may terminate thereafter.

Alternatively, in response to a sever being configured to handle expiration at step 419, the server may determine whether an expired tag is found (step 421). An expired tag is a timeliness tag that has an expired date prior to a current time, as measured by the server. If no expired tag is found, processing continues at step 429. However, in response to determining that an expired tag is among the timeliness tags, the server may exclude an HTML element associated with the at least one expired tag as the server responds to the client.

To exclude the HTML element that is associated with the expired tag, the server first determines whether strict timeliness handling is enabled (step 423). For example, the server may perform this step by parsing a configuration file to determine if an administrator set a suitable field or variable to an indication that timeliness should be strictly enforced. In response to an absence of strict enforcement, for example, as determined from the configuration file, the server may rewrite the HTML data of the web page according to a timeliness tag rule corresponding to the at least one timeliness tag (step 427). One timeliness tag rule can be to exclude the associated expired HTML elements. Alternatively, a timeliness tag rule can be to rewrite the HTML data to put a placeholder in place of the excluded HTML elements. For example, a text passage can be:

<p> This is a text passage</p>.

This text passage can be replaced with, <img src="http://a2.twimg.com/profile_images/604158358/TweetMe_normal.jpg"/>. Alternatively, the server may merely delete the content that is enclosed by the expired tag. In any case, the server can make an HTTP response to selectively incorporate one or more HTML elements based on timeliness tags present in a hypertext document referenced by the hypertext request. Processing may continue at step 429.

Alternatively, in response to determining that strict timeliness handling is enabled, the server may send an HTTP error to the client (step 425). This error may include use of the number "520" which is currently unused for other purposes in the HyperText Transfer Protocol. HTTP error "520" is not defined in conventional W3C HTTP standards. As such, "520" may be used to signal that the server has refused to provide a web-page due to the presence of an expired tag, or at least that a tag has been found in the web page, either directly, or by indirect reference, to be indicate that the current time is invalid. In other words, the timeliness tags, when compared to the current time, indicate that the current time is during an invalid period with respect to the timeliness tags. An invalid period is a time that is either before the earliest of a web page's create-date timeliness tags (which can be modified to include earliest-create-date in the head) or a time that is after the latest of the web page's expire-dates. It is appreciated that a number other than "520" may be used to signal that a page is being requested during an invalid period. In order for the web page to be not timely, the web page will be either expired or premature at, or substantially contemporaneously with, the time of the HTTP request. Processing may terminate thereafter.

FIG. 5 is a flowchart of methods and/or processes performed at a client machine in accordance with an illustrative embodiment of the invention. Initially, the client sends an HTTP request to a uniform resource locator (URL) (step 501). The client can be, for example, client 202 of FIG. 2. Next, the client may receive a web server response (step 503). The client may determine if the web server responds with an indication that the request is not timely. For example, the client may determine whether the web page is expired (step 505). In other words, the client, at step 505, may determine that the HTTP request is later than the valid period of the web page. A valid period is the time between the earliest create-date and the latest expire-date of the web page.

One way to make this determination is to receive and interpret an error code sent from the server. For example, if the web page is expired the client tests for the error code or number sent from the server, as described in step 425, in FIG. 4 above, and determines that the error code matches. Alternatively, some embodiments may, rather than test for web page expiration, test for validity of the time of the HTTP request as compared to the valid period of the web page. In other words, in such an embodiment, a premature time can generate a result that the HTTP request is not timely.

A positive result at step 505 may cause the client to render an HTTP response to the user (step 519). Rendering the response can be as simple as displaying the error code, for example, "520". A more elaborate response can be to describe in words the status of the web page as expired, premature, or otherwise untimely. Processing may terminate thereafter.

In response to the web page being unexpired, the client may analyze the HTML elements of the web page for timeliness tags (step 507). The client determines if it finds a timeliness tag (step 509). If not, the client displays the web page to the user (step 517) and processing terminates thereafter.

However, if the client finds a timeliness tag, the client determines whether it found references to metadata in a metadata registry (step 511). A format for references to a metadata registry is described further as registry references in FIG. 6, below. If one or more registry references is found, the client may request timeliness data from the metadata registry (step 513). The request may include the metadata registry URL and an identifier of the HTML element, for example, as described in FIG. 3B UID 350.

Otherwise, a negative result at step 511 may cause the client to treat the available timeliness tag dates according to step 515. The client may handle timeliness tags as configured by rules 515. Step 515 follows step 513 or a negative outcome to step 511.

A rule can be, for example, "entirely remove expired elements from the web page". A rule alternative can be, "enclose the expired element with additional logic to place alternative content in the place of the expired element". The alternative content can be rather simple, such as, for example, a placeholder. A placeholder can be some indicator that can be rendered to a display, that fills the region of a browser window with trivial content. The placeholder can be, for example, white space. The placeholder can be a small graphic image that symbolizes time or time expiration, prematurity, or the like. A third alternative rule can be, "provide login fields and corresponding validation in response to an expired element". A fourth alternative may be, "replace the expired element with a second element found elsewhere in the web page". Regardless of the rules, an unexpired or otherwise timely HTML element may be left unchanged by the client. The rules can be described in a configuration database.

Next, the client may display the web page to a user per step 517. Processing terminates thereafter.

FIG. 6 is an example of registry references in accordance with an illustrative embodiment of the invention. The create-date timeliness tag identifies a registry. The registry can be, for example, metadata registry 254 of FIG. 2. The metadata registry can be identified by its uniform resource locator (URL), in this case, http:///www.meta-registry.com. The metadata registry reference includes at least an URL as well as an indication of a field that is to be looked up. The URL can incorporate query fields that determine which row of the repository's data structure to look up, as well as the corresponding column or field entry. Create-date timeliness tag 603 references a UID of 1234 and a field name of "create-date". Accordingly, relying on data structure 300 of FIG. 3B, the metadata registry may lookup 2011-11-24 at the corresponding row and column.

Timeliness tag 607 is an alternative form of a timeliness tag. Timeliness tag 607 is a hybrid tag that references a metadata registry for both the create-date metadata and the expire-date metadata. Accordingly, when making determination as to the corresponding content, in this case, content known as "path/pic.bmp", the server or the client can parse a single start tag. Such an arrangement may be less burdensome to author than preparing two separate timeliness tags, as shown in timeliness tag 603 and 605.

The hybrid timeliness tag format may permit a mixed usage as well, for example as shown in timeliness tag 609.

All web pages begin with <html> tag 623. Web page excerpt 621 depicts this initial HTML tag, as well as the details placed in the 'head' element of the web page, as enclosed by <head> 625 and </head> 631. Excerpt 621 can be the product of a server in response to executing step 417 of FIG. 4, above. Accordingly, on the basis of previously located timeliness tags in the 'body' element of the web page, a server can create earliest-create-date timeliness tag 627 and latest-expire-date timeliness tag 629.

Accordingly, embodiments of the invention may permit a server and/or a client to provide alternative HTML elements, remove HTML elements, or inhibit rendering of a web page in response to detecting one or more expired HTML elements in a requested web page.

The flowchart and block diagrams in the Figures illustrate the architecture, functionality, and operation of possible implementations of methods according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

A data processing system suitable for storing and/or executing program code will include at least one processor coupled directly or indirectly to memory elements through a system bus. The memory elements can include local memory employed during actual execution of the program code, bulk storage, and cache memories, which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or computer readable tangible storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for responding to hypertext requests, the computer implemented method comprising:

a server receiving a hypertext request from a client;

responsive to receiving the hypertext request from the client, looking up a hypertext document, wherein looking up comprises obtaining a first HyperText Markup Language (HTML) element and a second HTML element and combining the first HTML element and second HTML element into a hypertext document;

parsing the hypertext document for timeliness tags, wherein a first at least one expire-date tag is a first timeliness tag associated with the first HTML element, the first at least one expire-date tag is expired, and a second at least one expire-date tag is a second timeliness tag associated with the second HTML element, the second at least one expire-date tag is not expired;

determining if at least one of the first and second at least one expire-date tags is expired; and responsive to a determination that at least one of the first and second at least one expire-date tags is expired, looking up a timeliness tag rule corresponding to an at least one expired tag, wherein looking up further comprises determining that the first at least one expire-date tag is among the at least one expired tag, and in response, transmitting the second HTML element to the client and excluding transmitting the first HTML element.

2. The computer implemented method of claim 1, wherein the computer implemented method further comprises:

responsive to receiving the hypertext request from the client, the server determining that a web server module is enabled, wherein looking up the hypertext document is in response to a determination that the web server module is enabled.

3. The computer implemented method of claim 2, wherein determining that the web server module is enabled further comprises:

the server parsing a configuration file for an indicator that the web server module is enabled.

4. The computer implemented method of claim 1, wherein a web server module is a software component executing in the server to dynamically generate a hypertext transfer protocol (HTTP) response to selectively incorporate one or more HTML elements based on timeliness tags present in a hypertext document referenced by the hypertext request.

5. The computer implemented method of claim 1, wherein parsing further comprises:
- the server parsing at least one timeliness tag of at least one of the first timeliness tag and the second timeliness tag;
- the server determining that the at least one timeliness tag contains a metadata registry reference;
- responsive to a determination that the at least one timeliness tag contains the metadata registry reference, the server requesting timeliness details from the metadata registry corresponding to the at least one timeliness tag; and
- the server receiving timeliness details corresponding to the at least one timeliness tag from a metadata registry reference.

6. The computer implemented method of claim 5, wherein receiving timeliness corresponding to the at least one timeliness tag details further comprises:
- the server substituting at least the metadata registry reference with the timeliness details.

7. The computer implemented method of claim 6, wherein the first timeliness tag comprises a string selected from the group of strings consisting of create-date and expire-date.

8. The computer implemented method of claim 1, wherein looking up the timeliness tag rule corresponding to the at least one expired tag comprises:
- determining that the timeliness tag rule is to exclude in response to an expired tag; and
- responsive to the determination that the timeliness tag rule is to exclude in response to an expired tag, excluding an HTML element associated with the at least one expired tag as the server responds to the client.

9. A computer implemented method to render hypertext documents, the computer implemented method comprising:
- a client sending a hypertext request;
- receiving a valid web server response, the response comprising hypertext and a first at least one timeliness tag;
- looking up a timeliness tag rule corresponding to the first at least one timeliness tag;
- determining that the timeliness tag rule is to display a placeholder in response to an expired tag being associated with a first HyperText Markup Language (HTML) element;
- responsive to the determination that the timeliness tag rule is to display the placeholder in response to the expired tag, determining whether the hypertext request is made during a valid period, as described by the first at least one timeliness tag, and in response, rendering the placeholder corresponding to the first HTML element having the first at least one timeliness tag and rendering a second HTML element having an unexpired timeliness tag; and
- parsing a metadata registry reference within the first at least one timeliness tag; and
- responsive to parsing the metadata registry reference, directing a request to a metadata registry described in the metadata registry reference, wherein the request comprises a unique identifier of content corresponding to the first at least one timeliness tag.

10. The computer implemented method of claim 9, further comprising:
- in response to a determination that the hypertext request is made during an invalid period, rendering a placeholder corresponding to the first HTML element.

11. The computer implemented method of claim 9, further comprising:
- in response to a determination that the hypertext request is made during a valid period, rendering the second HTML element.

\* \* \* \* \*